United States Patent [19]

Sulin

[11] Patent Number: 5,699,684
[45] Date of Patent: Dec. 23, 1997

[54] BICYCLE SECURITY MOUNT

[76] Inventor: John R. Sulin, 861 Fisher Rd., Fitchburg, Mass. 01420

[21] Appl. No.: 700,169

[22] Filed: Aug. 20, 1996

[51] Int. Cl.⁶ .............................. B62H 5/06; E05B 71/00
[52] U.S. Cl. .................. 70/234; 70/232; 70/DIG. 57; 211/5; 224/924; 248/551
[58] Field of Search ......................... 70/62, 229, 230, 70/231, 232, 233–235, DIG. 57; 280/304.1; 248/551, 552, 553; 211/5; 224/924

[56] References Cited

U.S. PATENT DOCUMENTS

| | | | |
|---|---|---|---|
| 3,828,993 | 8/1974 | Carter | 224/924 X |
| 4,842,148 | 6/1989 | Bowman | 224/924 X |
| 5,265,897 | 11/1993 | Stephens | 224/924 X |
| 5,275,319 | 1/1994 | Ruana | 224/924 X |
| 5,598,959 | 2/1997 | Lorensen et al. | 224/924 X |

FOREIGN PATENT DOCUMENTS

| | | | |
|---|---|---|---|
| 800104 | 9/1950 | Germany | 70/232 |
| 837323 | 4/1952 | Germany | 70/232 |

*Primary Examiner*—Lloyd A. Gall
*Attorney, Agent, or Firm*—Blodgett & Blodgett, P.C.

[57] ABSTRACT

A bicycle security mount which includes a base and a pair of spaced supporting arms extending outwardly from the base. Each supporting arm has a threaded aperture for receiving a bolt. A shield is mounted on each bolt. Each shield has a bore and a counterbore. The shank of the bolt extends freely through the bore and lies entirely within the counterbore of the shield. The tines of the front fork of a bicycle are positioned on the security mounts so that the tines straddle the supporting arms. Each tine is positioned between a supporting am and a shield. The bolt lies within the downwardly facing open ended slot of the tine so that the tine is clamped between the shield and the supporting arm. The clearance between the bolt and the inner surface of the counterbore is too small to receive a conventional socket wrench but large enough to receive a socket wrench which is specifically designed for the bicycle security mount. More specifically, the bicycle security mount includes a cap for each shield. Each cap includes a head portion which has a socket for receiving the shield and a connecting arm portion. Each connecting arm portion has a hole. When the caps are mounted on their respective shields, the ends of the connecting arm portions overlap and the holes in the connecting arms are axially aligned with one another and axially aligned with the hole in a bracket which extends between the supporting arms.

8 Claims, 3 Drawing Sheets

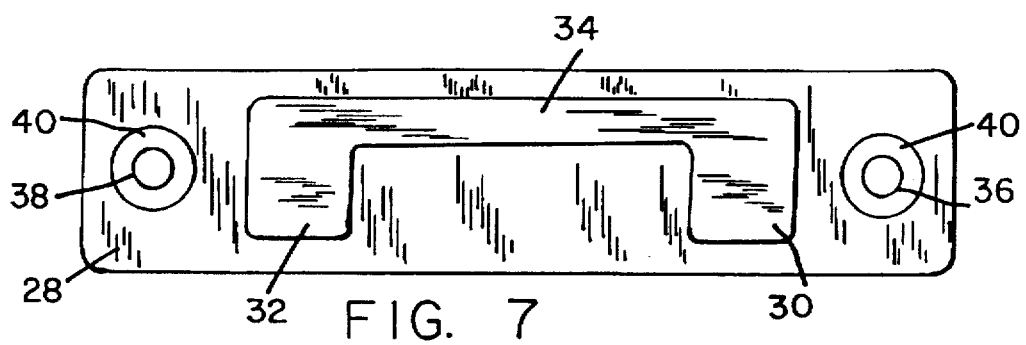
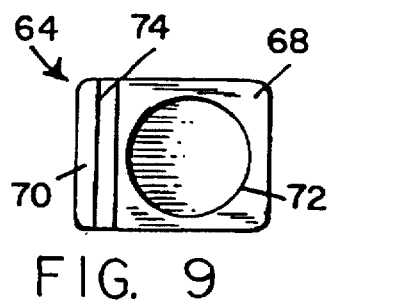
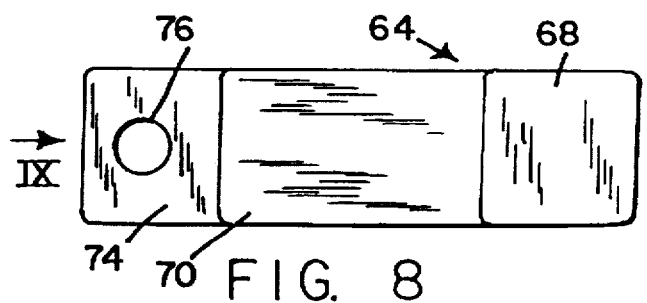
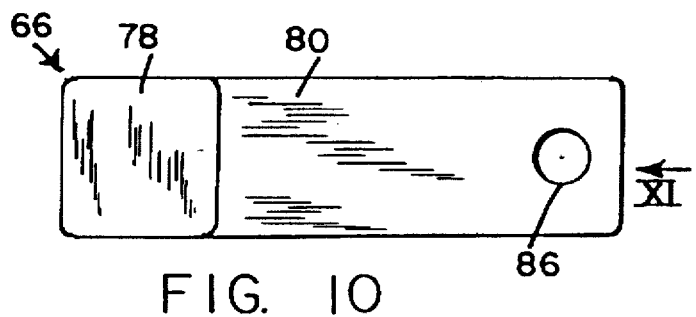
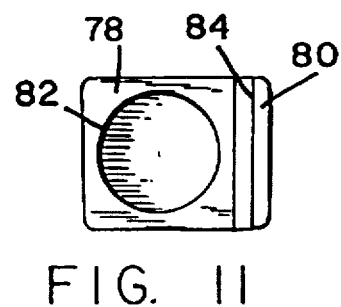
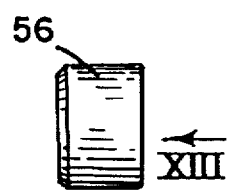
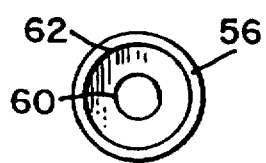
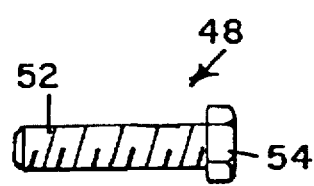

BICYCLE SECURITY MOUNT

BACKGROUND OF THE INVENTION

The present invention relates to a device for securely locking a bicycle to a fixed support or stand.

Many types of systems have been developed for supporting bicycles they are being transported, or at a fixed location. Most supporting means also have provisions for enabling the bicycle to be lockingly secured to a fixed support. A typical locking means includes a bicycle cable lock which can be looped through a portion of the bicycle, such as the frame, and an aperture or ring which forms part of the fixed support. The chain or cable includes a combination lock or a key operated lock for securing the cable lock in a closed loop. This type of locking arrangement prevents unauthorized use or theft of the bicycle in most circumstances. Impulsive or opportunistic theft is prevented. However, the cable or chain does not deter theft by a sophisticated or professional thief. Anyone who is specifically looking to steal a bicycle will have a cable cutter to cut the cable.

Other bicycle locking systems employ a padlock which includes a hasp that extends through a portion of the bicycle and an aperture in the support. The padlock can also be cut with a cable cutter. These and other difficulties experienced with the prior art bicycle supports have been obviated by the present invention.

It is, therefore, a principle object of the present invention to provide a bicycle support or mount which prevents unauthorized removal of the bicycle from the mount.

Another object of the invention is the provision of a bicycle security mount which can be used in conjunction with a padlock or standard cable lock to provide two levels of security.

A further object of the invention is the provision of a bicycle security mount which is removably attached to a fixed support, but which cannot be removed when a bicycle is secured to the mount.

It is another object of the invention to provide a bicycle security mount which is simple in construction, easy to use, and capable of a long life of useful service.

With these and other objects in view, as will be apparent to those skilled in the art, the invention resides in the combination of parts set forth in the specification and covered by the claims appended hereto.

SUMMARY OF THE INVENTION

In general, the invention consists of a bicycle security mount which includes a base and a pair of spaced supporting arms extending outwardly from the base. Each supporting arm has a threaded aperture for receiving a bolt. A shield is mounted on each bolt. Each shield has a bore which is narrower than the head of the bolt and a counterbore which is wider and longer than the head of the bolt. The shank of the bolt extends freely through the bore and lies entirely within the counterbore of the shield. The tines of the front fork of a bicycle are positioned on the security mount so that the tines straddle the supporting arms. Each tine is positioned between a supporting arm and a shield. The bolt lies within the downwardly facing open ended slot of the tine so that the tine is clamped between the shield and the supporting arm. The clearance between the bolt and the inner surface of the counterbore is too small to receive a conventional socket wrench but large enough to receive a socket wrench which is specifically designed for the bicycle security mount of the present invention. More specifically, the bicycle security mount of the present invention includes a cap for each shield. Each cap includes a head portion which has a socket for receiving the shield and a connecting arm portion. Each connecting arm portion has a hole. When the caps are mounted on their respective shields, the ends of the connecting arm portions overlap and the holes in the connecting arms are axially aligned with one another and axially aligned with the hole in a bracket which extends between the supporting arms. This enables the shackle of a padlock to be inserted through the holes in the connecting arm portions and the bracket and also enables a conventional bicycle cable lock to be inserted through the holes also for securing the front wheel of the bicycle to the bicycle security mount.

BRIEF DESCRIPTION OF THE DRAWINGS

The character of the invention, however, may be best understood by reference to one of its structural forms, as illustrated by the accompanying drawings, in which:

FIG. 7 is a top plan view of the bicycle security mount with the caps, shields, and the bolts which are associated with the shields removed;

FIG. 8 is a front elevational view of the right hand cap;

FIG. 9 is an end view of the cap, looking in the direction of arrow IX of FIG. 8;

FIG. 10 is a from elevational view of the left hand cap;

FIG. 11 is an end view of the left hand end cap, looking in the direction of arrow XI of FIG. 10;

FIG. 12 is a front elevational view of the right hand shield;

FIG. 13 is an end view of the right hand shield, looking in the direction of arrow XIII of FIG. 12; and FIG. 14 is a front elevational view of the right hand bolt.

DETAILS OF THE DESCRIPTION OF THE INVENTION

Figure 1:
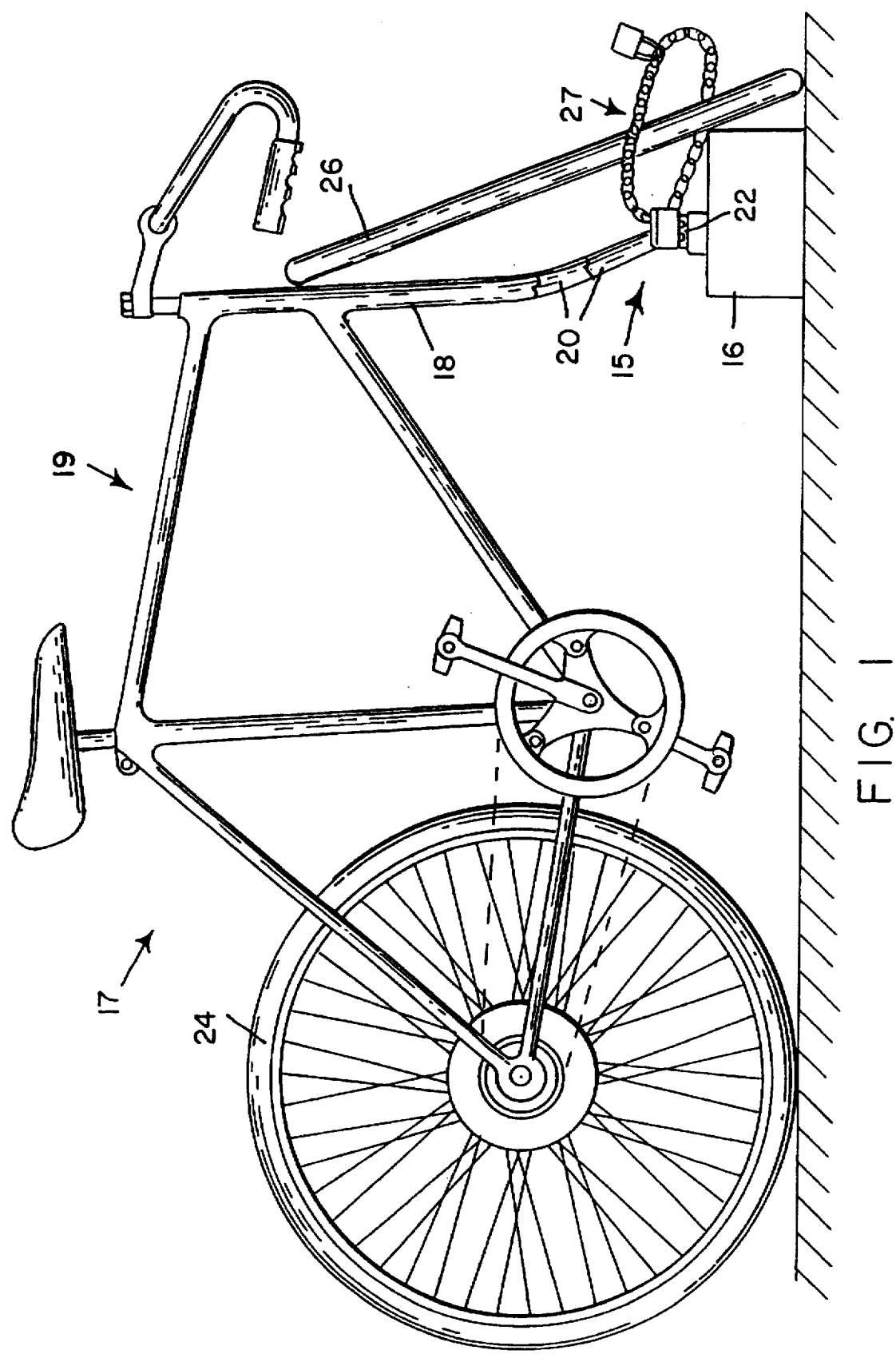
FIG. 1 is a side elevational view of a bicycle security mount of the present invention shown mounted on a fixed support and secured to the front fork of a conventional bicycle.

Referring first to FIG. 1, the bicycle security mount of the present invention is generally indicated by the reference numeral 15 and is showed fixedly mounted on a fixed support 16 and secured to a conventional bicycle, generally indicated by the reference numeral 17. The bicycle 17 includes a framework, generally indicated by the reference numeral 19, a rear Wheel 24 and a from wheel 26. The frame 19 includes a from fork 18 which has a pair of tines 20 at the lower end of the fork. Each tine 20 has a downwardly facing open ended slot 22. In some bicycles, the slot 22 faces downwardly and rearwardly. The front wheel 26 of the bicycle is secured to the bicycle security mount by any conventional bicycle locking cable or chain, generally indicated by the reference numeral 27, in a manner to be described.

Referring to FIGS. 2–7, the bicycle security mount 15 includes a base 28, first and second spaced supporting arms 30 and 32 extending upwardly from the base, and a bracket 34 which extends between the supporting arms 30 and 32. The base 28 has a pair of holes 36 and 38 for receiving fasteners such as screws 40 for securing the base to a fixed support, such as the support 16 shown in FIG. 1. The bracket 34 has a hole 42. The arm 30 has a first threaded aperture 44. The arm 32 has a second threaded aperture 46 which is axially aligned with the aperture 44. In the preferred embodiment of the invention, each aperture 44 and 46 contains a threaded insert.

Referring FIGS. 2–6 and 14, the bicycle security mount 15 also includes a first bolt which is generally indicated by the reference numeral 48 and a second bolt which is generally indicated by the reference numeral 50. The second bolt 50 is identical to the first bolt 48 which is illustrated in FIG. 14. Each of the bolts 48 and 50 includes a threaded shank portion 52 which is threaded into the apertures 44 and 46 and a hexagonal head portion 54. A first shield 56 is mounted on the bolt 48. A second shield 58 is mounted on the bolt 50. The first shield 56 is illustrated more clearly in FIGS. 12 and 13 and is identical to the shield 58. Each of the shields 56 and 58 has a bore 60 which is substantially smaller than the hexagonal head portion 54 of the bolt and the counterbore 62 is substantially larger than the hexagonal head portion 54. The shank portion 52 of the bolt extends through the bore 60 from the counterbore end of the shield and its head portion 54 fully lies entirely within the counterbore 62. The spacing between the head portion 54 and the inner cylindrical surface which defines the counterbore 62 is too small to receive a conventional socket wrench of a size which would normally engage a hexagonal bolt head, such as head portion 54. However, the counterbore 62 is large enough to receive a socket wrench which is specifically designed for use with the bicycle security mount of the present invention.

Figure 2:
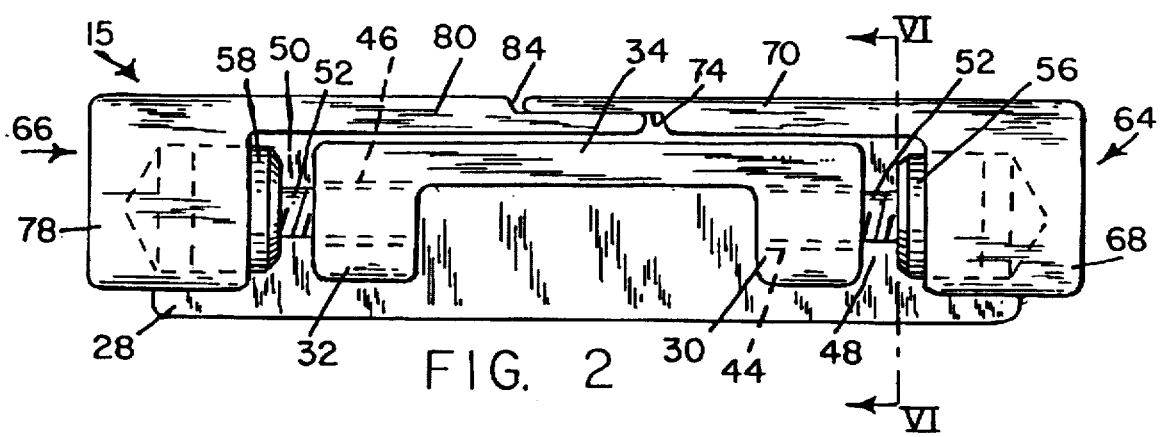
FIG. 2 is a top plan view of the bicycle security mount.
Figure 3:
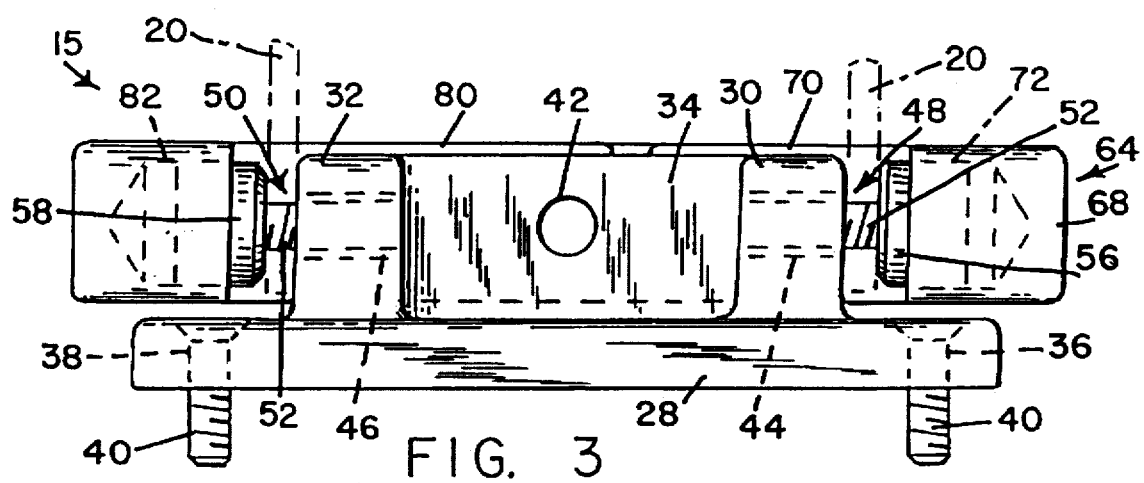
FIG. 3 is a front elevational view thereof.
Figure 4:
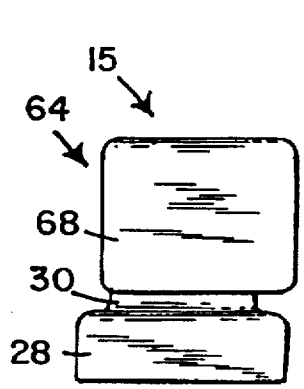
FIG. 4 is a right side elevational view thereof.
Figure 6:
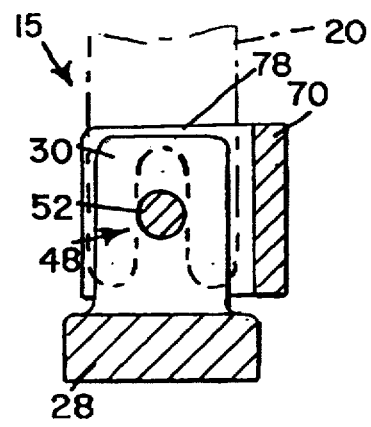
FIG. 6 is a vertical cross-sectional view of the bicycle security mount, taken along line VI—VI and looking in the direction of the arrow.
Figure 5:
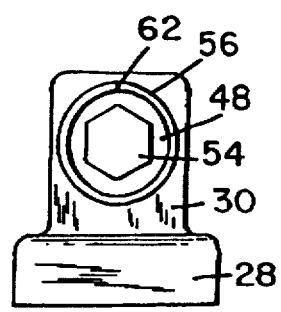
FIG. 5 is a right side elevational view thereof, with the cap portion of the mount removed.

Referring to FIGS. 2–4 and 8–11, the bicycle security mount 15 of the present invention also includes a first cap, generally indicated by the reference numeral 64, and a second cap, generally indicated by the reference numeral 66. The first cap 64 includes a first head portion 68 and a first connecting arm portion 70. The head portion 68 has a socket 72 for receiving the first shield 56. The second head portion 78 has a socket 82 for receiving the second shield 58. The forwardly facing surface of the first connecting arm portion 70 has a recessed portion 74 adjacent the free end of the connecting arm portion and a hole 76 at the recessed portion 74. The second cap 66 has a second head portion 78 and a second arm portion 80. The second head portion 78 has a socket 82 for receiving the second shield 58. The rearwardly facing surface of the second connecting arm portion 80 has recessed portion 84 adjacent the free end thereof and a hole 86 at the recessed portion 84. When the first and second head portion 68 and 78, respectively, are positioned on the first and second shields 56 and 58, respectively, as shown in FIGS. 2 and 3, the recessed portions 74 and 84 abut so that the hole 76 and 86 are aligned with each and with the hole 42 in the bracket 34.

OPERATION OF THE INVENTION

The operation and advantages of the present invention will now be readily understood in view of the above description. A bicycle, such as bicycle 17, is secured to the bicycle security mount 15 of the present invention by first removing the front wheel 26 of the bicycle so that the tines 20 of the front fork 18 are free. The tines 20 are positioned outside of the first and second supporting arms 30 and 32. One tine is between arm 30 and shield 56. The other tine is between arm 32 and shield 58 so that the shanks 52 of the bolts 48 and 50 extend into the downwardly facing or downwardly and rearwardly facing open ended slots 22 of the tines 20. Prior to insertion of the tines 20, the bolts 48 and 50 are loosened so that the space between each of the shields 56 and 58 and its respective supporting arm is slightly greater than the thickness of the tines 20. Thereafter, the bolts 48 and 50 are tightened by a special socket wrench which is designed to fit into the counterbore 62 of each shield and drivingly engaging the hexagonal head 54. Tightening of each of bolts 48 and 50 causes each of the shields 36 and 58 to advance towards its respective supporting arm and to clamp the tines 20 positioned therebetween so that the front fork 18 of the bicycle is securely held on the bicycle security stand.

The caps 64 and 66 are secured to the bracket 34 by inserting the shackle of a padlock through the hole 76, 86, and 42. The caps 64 and 66 may also be secured to the bracket 34 by inserting one free end of a conventional bicycle chain through the holes 76, 86, and 42 and also around the rim of the front tire 26 and then coupled with the other free end of the chain by a conventional padlock, thus, securing the front wheel 26 to the bicycle frame. The caps 64 and 66 cover the opening to the counterbores 62 of the shields 56 and 58, respectively, to prevent access to the counterbores and to the heads 54 of the bolts by any tool. If a would be thief is equipped with a cutting tool which is capable of cutting the cable lock, the caps 64 and 66 can be removed. However, since the counterbores 62 are hidden by the caps 64 and 66 the inaccessible nature of the shields 56 and 58 is unanticipated by the thief. The thief will be unprepared to deal with the fact that a socket was required and even more unlikely to be prepared to deal with the fact that a specialized socket wrench is also required.

The base 28 can be removably applied to any supporting structure which is provided with threaded apertures for receiving the bolts 40. However, once that a bicycle is secured to the bicycle security mount 15 of the present invention, the supporting base 28 cannot be removed, since access to the bolts 40 is blocked by the shields 56 and 58 alone or in combination with the caps 64 and 66, respectively. The holes 36 and 38 lie directly beneath the shield 56 and 58, respectively, when they are in clamping position on the bolts 48 and 50, respectively.

The invention having been thus described, what is claimed as new and desired to secure by letters patent is:

1. A bicycle security mount for a bicycle having a two-tined fork which has a forwardly facing open ended slot in each tine, said bicycle security mount comprising:
 (a) a base;
 (b) securing means for securing the base to a fixed support;
 (c) a first supporting arm fixed to the base, said first supporting arm having a first threaded aperture;
 (d) a second supporting arm fixed to the base and spaced from said first supporting arm, said second supporting arm having a second threaded aperture which is axially aligned with said first threaded aperture;
 (e) a first bolt having a polygonal head and a threaded shank which is threaded into said first aperture;
 (f) a second bolt having a polygonal head and a threaded shank which is threaded into said second aperture;
 (g) a first shield mounted on said first bolt, said first shield having a bore which is narrower than the head of said first bolt and a counterbore which is wider and longer than the head of said first bolt, said first shield being positioned on said first bolt so that the shank of said first bolt extends freely through the bore of said first shield and the head of said first bolt lies within the counterbore of said first shield;

(h) a second shield mounted on said second bolt, said second shield having a bore which is narrower than the head of said second bolt and a counterbore which is wider and longer than the head of said second bolt, said second shield being positioned on said second bolt so that the shank of said second bolt extends freely through the bore of said second shield and the head of said second bolt lies within the counterbore of said second shield; and (i) said first and second supporting arms being spaced so that the tines of a wheelless front fork of a bicycle can straddle said first and second supporting arms and so that the shanks of said first and second bolts extend into the open ended slots of the front fork and the tines of the front fork are positioned respectively between said first and second arms and the said first and second shields, the heads of said first and second bolts lying entirely within the respective counterbores of said first and second shields when said fork is applied to the shank of said first and second bolts and said first and second bolts are tightened to clamp said front fork between said first and second supporting arms and said first and second shields, each of said counterbores having a diameter which is greater than the width of said first and second bolts, said diameter being too small to receive a conventional socket wrench but large enough to receive a socket wrench which is specifically designed for said bicycle security mount.

2. A bicycle security mount as recited in claim 1, further comprising a bracket which is fixed to said base and which has a hole for receiving a locking mechanism for securing the front wheel of the bicycle to said bracket.

3. A bicycle security mount as recited in claim 2, wherein said bracket extends between said first and second supporting arms.

4. A bicycle security mount as recited in claim 3, further comprising:

(a) a first cap which has a first connecting arm portion and a first head portion, said first head portion having a socket for receiving said first shield, said first connecting arm portion having a hole which is aligned with the hole of said bracket when said first shield lies within the socket of said first head portion; and (b) a second cap which has a second connecting arm portion and a second head portion, said second head portion having a socket for receiving said second shield, said second connecting arm portion having a hole which is aligned with the hole of said bracket when said second shield lies within the socket of said second head portion, thereby enabling said locking mechanism to extend through the holes in said bracket and said first and second connecting arm portions to lockingly maintain said first and second caps in a covering position on said first and second shields, respectively.

5. A bicycle security mount as recited in claim 1, further comprising:

(a) a first cap which has a first connecting arm portion and a first head portion, said first head portion having a socket for receiving said first shield, said first connecting arm portion having a hole; and (b) a second cap which has a second connecting arm portion and a second head portion, said second head portion having a socket for receiving said second shield, said second connecting arm portion having a hole which is aligned with the hole of said first connecting arm portion when said first shield lies within the socket of said first head portion and said second shield lies within the socket of said second head portion, so that a locking mechanism can extend through the holes of said first and second connecting arm portions to lockingly maintain said first and second caps in a covering position on said first and second shields, respectively.

6. A bicycle security mount as recited in claim 5, wherein each of said first and second connecting arm portions has an inner surface which faces said first and second supporting arms and an outer surface which faces away from said first and second supporting arms, each of said first and second connecting arms portions having a free end, one of said first and second connecting arms portions having a recess in its inner surface adjacent its free end and the other of said first and second connecting arm portions having a recess in its outer surface so that the recessed portions of said inner and outer surfaces overlap and abut.

7. A bicycle security mount as recited in claim 5, wherein each of said first and second connecting arm portions has a free end portion which contains its hole, the free end portion of said first connecting arm portion overlapping the free end portion of said second connection arm portion so that the holes in said free end portions are aligned, the free end portion of said first connecting arm being offset relative to said second connecting arm portion along a central longitudinal axis of said holes so that the sockets of said first and second caps are axially aligned.

8. A bicycle security mount as recited in claim 1, wherein said base has a first hole aligned with said first shield and a second hole aligned with said second shield, and wherein said securing means comprises fasteners extending through said first and second holes, said fasteners being engageable by an appropriate tool for removably securing said base to a fixed support when said first and second shields and said first and second bolts are removed from first and second supporting arms, said fasteners being inaccessible to said tool for removing said fasteners when the front fork of a bicycle is clamped between said first and second shield and said first and second supporting arms.

* * * * *

UNITED STATES PATENT AND TRADEMARK OFFICE
CERTIFICATE OF CORRECTION

PATENT NO : 5,699,684
DATED : Dec. 23, 1997
INVENTOR(S): John Sulin

It is certified that error appears in the above-identified patent and that said Letters Patent is hereby corrected as shown below:

Col. 1, line 5;   delete "looking" and replace with --locking--.

line 11;   delete "looking" and replace with --locking--; and delete "look" and replace with --lock--.

line 13;   delete "look" and replace with --lock--.

line 14;   delete "look" and replace with --lock--; both occurrences.

line 15;   delete "looking" and replace with --locking--.

line 22;   delete "looking" and replace with --locking--.

line 33;   delete "look" and replace with --lock--.

UNITED STATES PATENT AND TRADEMARK OFFICE
CERTIFICATE OF CORRECTION

PATENT NO : 5,699,684
DATED : Dec. 23, 1997
INVENTOR(S): John Sulin

It is certified that error appears in the above-identified patent and that said Letters Patent is hereby corrected as shown below:

| | | |
|---|---|---|
| Col. 2, line 39; | delete "from" and replace with --front--. |
| line 57; | delete "from" and replace with --front. |
| line 58; | delete "from" and replace with --front--. |
| Col. 3, line 67; | delete "fine" and replace with --tine--. |

Signed and Sealed this

Twenty-eighth Day of April, 1998

Attest:

BRUCE LEHMAN

Attesting Officer

Commissioner of Patents and Trademarks